(12) United States Patent
Khial et al.

(10) Patent No.: US 11,131,546 B2
(45) Date of Patent: Sep. 28, 2021

(54) INTEGRATED OPTICAL GYROSCOPE WITH NOISE CANCELLATION

(71) Applicant: California Institute of Technology, Pasadena, CA (US)

(72) Inventors: Parham Porsandeh Khial, Pasadena, CA (US); Seyed Ali Hajimiri, La Canada, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 16/701,810

(22) Filed: Dec. 3, 2019

(65) Prior Publication Data

US 2020/0278207 A1 Sep. 3, 2020

Related U.S. Application Data

(63) Continuation of application No. 15/993,525, filed on May 30, 2018, now Pat. No. 10,495,462.

(60) Provisional application No. 62/512,619, filed on May 30, 2017.

(51) Int. Cl.
*G01C 19/72* (2006.01)
*G01C 19/64* (2006.01)

(52) U.S. Cl.
CPC .......... *G01C 19/722* (2013.01); *G01C 19/64* (2013.01); *G01C 19/727* (2013.01)

(58) Field of Classification Search
CPC .... G01C 19/722; G01C 19/721; G01C 19/72; G01C 19/727
See application file for complete search history.

(56) References Cited

U.S. PATENT DOCUMENTS

| | | |
|---|---|---|
| 4,658,401 A | 4/1987 | Segre et al. |
| 4,702,601 A | 10/1987 | Schroder |
| 4,708,480 A | 11/1987 | Sasayama et al. |

(Continued)

FOREIGN PATENT DOCUMENTS

| | | |
|---|---|---|
| CN | 103389084 A | 11/2013 |
| WO | WO 2018/222768 A1 | 12/2018 |

OTHER PUBLICATIONS

Grant et al., "Double-Ring Resonator Optical Gyroscopes," Journal of Lightwave Technology, 36(13):2708-2715, (2018).

(Continued)

*Primary Examiner* — Michael P LaPage
(74) *Attorney, Agent, or Firm* — Alston & Bird LLP

(57) ABSTRACT

An optical gyroscope includes, in part, an optical switch, a pair of optical rings and a pair of photodetectors. The optical switch supplies a laser beam. The first optical ring delivers a first portion of the beam in a clockwise direction during the first half of a period, and a first portion of the beam in a counter clockwise direction during the second half of the period. The second optical ring delivers a second portion of the beam in a counter clockwise direction during the first half of the period, and a second portion of the beam in a clockwise direction during the second half of the period. The first photodetector receives the beams delivered by the first and second optical rings during the first half of the period. The second photodetector receives the beams delivered by the first and second optical rings during the second half of the period.

6 Claims, 12 Drawing Sheets

(56) References Cited

U.S. PATENT DOCUMENTS

| | | | | |
|---|---|---|---|---|
| 5,157,461 | A | * | 10/1992 | Page .................... G01C 19/72 356/462 |
| 5,237,387 | A | | 8/1993 | Sanders |
| 5,327,215 | A | | 7/1994 | Bernard et al. |
| 5,394,242 | A | * | 2/1995 | Porter .................. G01C 19/727 356/461 |
| 5,767,969 | A | * | 6/1998 | Chevalier ............ G01C 19/727 356/461 |
| 5,969,816 | A | | 10/1999 | Kim et al. |
| 6,259,089 | B1 | * | 7/2001 | Vali ..................... G01C 19/722 250/227.19 |
| 6,587,205 | B2 | * | 7/2003 | Goldner ............... G01C 19/722 356/465 |
| 8,823,946 | B1 | | 9/2014 | Logan, Jr. et al. |
| 9,389,081 | B1 | * | 7/2016 | Strandjord ............ G01C 19/72 |
| 10,495,462 | B2 | | 12/2019 | Khial et al. |
| 2006/0285788 | A1 | | 12/2006 | Meyer |
| 2008/0013094 | A1 | | 1/2008 | Wilfinger |
| 2008/0291459 | A1 | * | 11/2008 | Meyer .................. G01C 19/721 356/462 |
| 2016/0146607 | A1 | | 5/2016 | Celikel |
| 2016/0238392 | A1 | * | 8/2016 | Wen ........................ H01S 3/082 |
| 2016/0298446 | A1 | * | 10/2016 | Maida ..................... G01V 3/30 |
| 2019/0049249 | A1 | * | 2/2019 | Wu ..................... G02B 6/12007 |

OTHER PUBLICATIONS

U.S. Appl. No. 15/993,525, Notice of Allowance and Examiner Interview Summary Record dated Jul. 29, 2019.

WIPO Application No. PCT/US2018/035207, International Search Report and Written Opinion dated Oct. 30, 2018.

Heimala, et al., "Integrated optical ring resonator on silicon with thermal tuning and in-situ temperature measurement," SPIE, vol. 2695, pp. 71-77, (Jan. 10, 1996).

EP 18810298.2 Extended European Search Report dated Jan. 21, 2021.

WIPO Application No. PCT/US2018/035207, PCT International Preliminary Report on Patentability dated Dec. 3, 2019.

* cited by examiner

INTEGRATED OPTICAL GYROSCOPE WITH NOISE CANCELLATION

CROSS REFERENCE TO RELATED APPLICATIONS

The present application claims benefit under 35 USC 119(e) of Application Ser. No. 62/512,619 filed May 30, 2017, the content of which is incorporated herein by reference in its entirety.

FIELD OF THE INVENTION

The present invention relates to a gyroscope, and more particularly to an optical gyroscope.

BACKGROUND OF THE INVENTION

Gyroscopes are used in a variety of devices, such as smartphones, cars, aircrafts and the like for navigation. As is known, a tradeoff exists between the accuracy of a gyroscope and its size. For example, ring laser gyroscopes or fiber optic gyroscopes with relatively high accuracy are expensive and bulky. Micro electro-mechanical systems (MEMS) based gyroscopes are relatively small but lack precision.

Conventional benchtop laser-based gyroscopes require high precision alignment, clean medium and a high-quality laser source to detect small phase shift (due to Sagnac effect) and to minimize noise.

BRIEF SUMMARY OF THE INVENTION

An optical gyroscope, in accordance with one embodiment of the present invention, includes, in part, an optical switch adapted to deliver a laser beam to a first path during a first half of a period and to a second path during a second half of the period, a first optical ring configured to deliver a first portion of the beam received from the first path in a clockwise direction during the first half of the period, and further to deliver a first portion of the beam received from the second path in a counter clockwise direction during the second half of the period, a second optical ring configured to deliver a second portion of the beam received from the first path in a counter clockwise direction during the first half of the period, and further to deliver a second portion of the beam received from the second path in a clockwise direction during the second half of the period, a first photodetector adapted to receive the beams delivered by the first and second optical rings during the first half of the period, and a second photodetector adapted to receive the beams delivered by the first and second optical rings during the second half of the period.

The optical gyroscope, in accordance with one embodiment of the present invention, further includes, in part, a first trans-impedance amplifier adapted to amplify the output signal of the first photodetector by a first amplification value, and a second trans-impedance amplifier adapted to amplify the output signal of the second photodetector by a second amplification value. The optical gyroscope, in accordance with one embodiment of the present invention, further includes, in part, a first phase modulator adapted to delay a beam received or delivered by the first optical ring by a first predefined phase value. In one embodiment, the first predefined phase value is a 90° phase value.

In some embodiments, the optical gyroscope further includes, in part, a signal combiner adapted to generate a first signal representative of a combined outputs of the first and second trans-impedance amplifiers. In some embodiments, the optical gyroscope further includes, in part, a bandpass filter adapter to filter the first signal. In some embodiments, the optical gyroscope further includes, in part, a mixer adapted to downconvert a frequency of the filtered first signal to generate a baseband signal. In some embodiments, the optical gyroscope further includes, in part, a controller adapted to convert the baseband signal to a digital signal, and generate a signal representative of a degree of rotation of the optical gyroscope about an axis in response to the digital signal.

In one embodiment, the first and second optical rings are ring resonators. In one embodiment, each of the first and second ring resonators further includes, in part, one or more heating elements adapted to tune the resonator. In one embodiment, the heating elements are resistive heating elements integrated with the first and second ring resonators. In one embodiment, the signal combiner is adapted to add output signals of the first and second trans-impedance amplifiers. In one embodiment, the optical switch includes a Mach Zehnder interferometer.

In one embodiment, the optical gyroscope further includes, in part, a second phase modulator adapted to delay a signal received or delivered by the second optical ring by a second predefined phase value. In one embodiment, the second phase value is a 90° phase value.

A method of determining a degree of orientation about an axis, in accordance with one embodiment of the present invention, includes, in part, delivering a laser beam to a first path during a first half of a period and to a second path during a second half of the period, delivering a first portion of the beam received from the first path to a first optical ring in a clockwise direction during the first half of the period, delivering a first portion of the beam received from the second path to the first optical ring in a counter clockwise direction during the second half of the period, delivering a second portion of the beam received from the first path to a second optical ring in a counter clockwise direction during the first half of the period, delivering a second portion of the beam received from the second path to the second optical ring in a clockwise direction during the second half of the period, detecting the beams delivered by the first and second optical rings during the first half of the period to generate a first signal, and detecting the beams delivered by the first and second optical rings during the second half of the period to generate a second signal.

The method, in accordance with one embodiment of the present invention, further includes, in part, amplifying the first signal by a first amplification value to generate a first amplified signal, and amplifying the second signal by a second amplification value to generate a second amplified signal. The method, in accordance with one embodiment of the present invention, further includes, in part, delaying a beam received or delivered by the first optical ring by a first predefined phase value. In one embodiment, the first predefined phase value is a 90° phase value.

In one embodiment, the method further includes, in part, combining the first and second amplified signals to generate a combined signal. In one embodiment, the method further includes, in part, filtering the combined signal to generate a filtered signal. In one embodiment, the method further includes, in part, downconverting the frequency of the filtered signal to generate a baseband signal. In one embodiment, the method further includes, in part, converting the baseband signal to a digital signal, and generating a value representative of a degree of rotation of the optical gyroscope about an axis in response to the digital signal.

In one embodiment, the first and second optical rings are ring resonators. In one embodiment, the method further includes, in part, tuning the first and second ring resonators by applying heat. In one embodiment, combining of the first and second amplified signals includes, adding the first and second amplified signals to another signal. In one embodiment, the method further includes, in part, delaying a beam received or delivered by the second optical ring by a second predefined phase value. In one embodiment, the second predefined phase value is a 90° phase value.

An optical gyroscope, in accordance with one embodiment of the present invention, includes, in part, first and second optical paths formed using optical waveguides in a semiconductor substrate, a coherent laser source generating two optical signals traveling in the first optical path in one direction and in the second optical path in a second direction opposite the first direction, and a photodetector adapted to receive the beams delivered by the first and second optical paths.

In one embodiment, at least one of the optical waveguides is an optical ring. In one embodiment, the optical ring is a ring resonator. In one embodiment, the optical gyroscope further includes, in part, an amplifier adapted to amplify an output of the photodetector. In one embodiment, the photodetector is adapted to receive the beams delivered by the first and second optical paths during a first half of each period. In one embodiment, the optical gyroscope further includes, in part, a second photodetector adapted to receive the beams delivered by the first and second optical paths during a second half of each period.

In one embodiment, the optical gyroscope further includes, in part a combiner adapted to combine the output of the first photodetector with a first signal during each first half of each period and to combine the output of the second photodetector with the first signal during each second half of each period.

In one embodiment, the optical gyroscope further includes, in part, a switch configured to switch between the outputs of the first and second photodetectors. In one embodiment, the optical gyroscope further includes, in part, a heater adapted to heat the ring resonator. In one embodiment, the optical gyroscope further includes, in part, a phase modulator adapted to modulate a phase of the beam delivered to or received from the ring resonator.

DETAILED DESCRIPTION OF THE INVENTION

In accordance with embodiments of the present invention, an integrated optical gyroscope has a high precision, enhanced immunity to noise and is relatively inexpensive to manufacture.

Figure 1A:
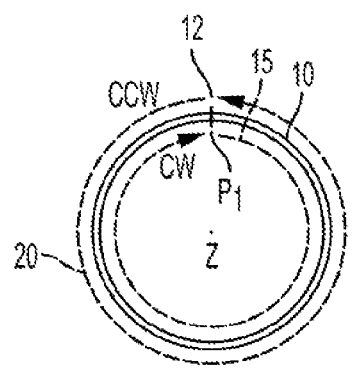
FIG. 1A shows an optical ring in a stationary state and disposed in a gyroscope, as known in the prior art.

FIG. 1A shows an optical ring 10 assumed to be a part of a gyroscope and adapted to be able to spin about the z axis (perpendicular to the plane of the page). Assume that two laser beams 15 and 20 enter the ring at entry point 12 at the same time. Assume further that beam 15 is caused to travel in a clockwise direction (CW) and beam 20 is caused to travel in a counter clockwise direction (CCW). If the force applied to the gyroscope does not cause ring 10 to rotate about the z-axis (thereby maintaining ring 10 in a stationary state) the position $P_1$ of entry point 12 does not change and therefore both beams 15 and 20 reach the entry point 12 at the same, as shown in FIG. 1A.

Figure 1B:
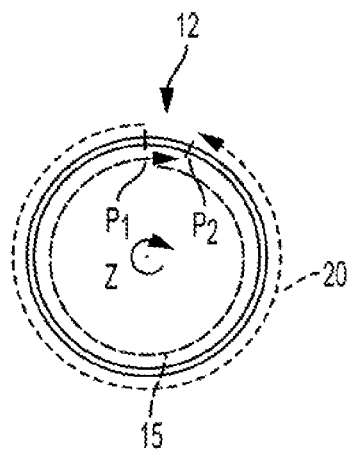
FIG. 1B shows the optical ring of FIG. 1 after rotating along the z-axis and in a counter clock-wise direction, as shown in the prior art.

Assume, that due to an applied force, optical ring 10 is caused to rotate about the z-axis and in a CW direction, as shown in FIG. 1B, thereby causing a change in position of entry point 12 from $P_1$ to $P_2$. This causes beam 15 to travel a longer distance to reach position $P_2$ than it does beam 20.

The extra distance traveled by beam 15 relative to beam 20 causes a time difference Δt defined by the following expression:

$$\Delta t \approx \frac{4\pi R^2 \omega}{C^2} = \frac{4A\omega}{C^2} \quad (1)$$

In equation (1), R, ω and A respectively represent the radius, angular velocity and area of optical ring 10, and c represents the speed of light. By measuring the time differenceΔt, the angular velocity ω and hence the degree of orientation about the z-axis is determined. Although not shown, it is understood that a gyroscope has three such rings each adapted to rotate about one of the x, y and z axes.

Conventional optical gyroscopes suffer from a number of sources of noise, such as, for example, (i) thermal noise (thermal fluctuations) inside the waveguide or fiber thus inducing phase shift, (ii) fabrication mismatches, (iii) laser phase noise; and (iv) mode conversion inside the waveguide or fiber. An optical gyroscope, in accordance with embodiments of the present invention, minimizes the above sources of noise.

Figure 2:
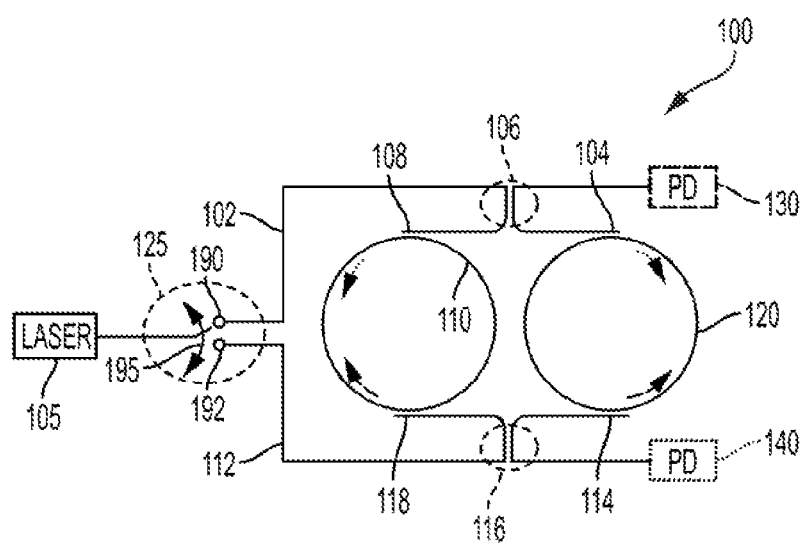
FIG. 2 is a simplified high-level block diagram of components of an optical gyroscope adapted to detect the amount of spin or rotation along an axis, in accordance with one embodiment of the present invention.

FIG. 2 is a simplified high-level block diagram of components of an optical gyroscope 100 adapted to detect the amount of spin or rotation about, e.g., the z-axis (perpendicular to the plane of the page), in accordance with one embodiment of the present invention. Although not shown, it is understood that optical gyroscope 100 also includes similar components adapted to detect the amount of rotations about both x and y axes.

The, e.g., z-axis components of optical ring 100 are shown as including an optical switch 125, first and second optical paths 102, 112, first and second optical rings 110, 120, and first, second, third, fourth, fifth and sixth directional couplers 104, 106, 108, 114, 116, 118, and first and second photodetectors 130, 140.

The laser beam supplied by laser source 105 is delivered to optical switch 125 which has a switching frequency of $f_0$ defined by the period 1/T. During a first half of each such period T, switch 195 of optical switch 125 is placed in position 190 so as to deliver the laser beam to first optical path 102 which is subsequently detected by photodetector 140. During a second half of each such period, optical switch 125 is placed in position 192 so as to deliver the laser beam to second optical path 112 which is subsequently detected by photodetector 130.

The laser beam in path 102 (received during the first half of each period T) is delivered to optical ring 110 by directional couplers 106, 108, and to optical ring 120 by directional couplers 106, 104. The beam so delivered to optical ring 110 travels in a counter clock-wise direction and received at photodetector 140 via directional couplers 118 and 116. In a similar manner, the beam in optical ring 120 travels in a clock-wise direction and received at photodetector 140 via directional couplers 114 and 116.

The laser beam in path 112 (received during the second half of each period T) is delivered to optical ring 110 by directional couplers 116, 118, and to optical ring 120 by directional couplers 116, 114. The beam so delivered to optical ring 110 travels in a counter clock-wise direction and received at photodetector 130 via directional couplers 108 and 106. In a similar manner, the beam in optical ring 120 travels in a counter clock-wise direction and received at photodetector 130 via directional couplers 104 and 106.

When the direction of the coherent laser beam is switched between paths 102 and 112, in accordance with one aspect of the present invention, the common mode of the two output signals generated by photodetectors 130 and 140 capture the effect of fabrication mismatches, thermal noise, and other sources of mismatch. On the other hand, the differential mode of the two output signals generated by photodetectors 130 and 140 contains the information regarding the desired signal which is the phase shift due to spinning of the gyroscope. In other words, when the switching frequency of optical switch 125 is selected to be relatively high, noise contributions caused, for example, by phase shifts induced by thermal fluctuations (which are in the kHz range) as well as other non-idealities are canceled out. Moreover, because each spin axis of an optical gyroscope, in accordance with one aspect of the present invention, includes a pair of rings each enabling the beam to travel in one direction only, embodiments of the present invention inhibit back reflections of the beam due to non-ideal characteristics of the waveguides (or fiber) that is common in conventional gyroscopes.

Figure 3:
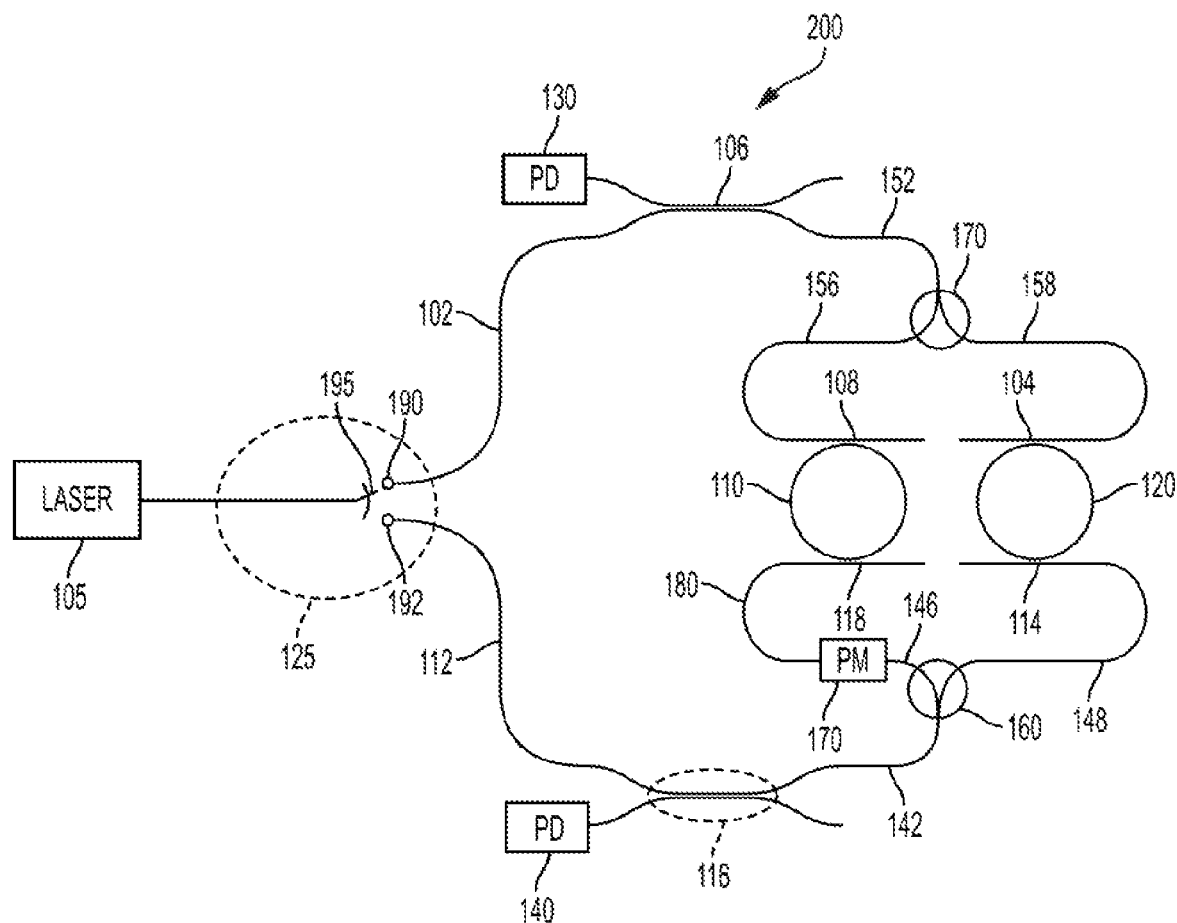
FIG. 3 is a simplified high-level block diagram of components of an optical gyroscope adapted to detect the amount of spin along an axis, in accordance with one embodiment of the present invention.

FIG. 3 is a simplified high-level block diagram of components of an optical gyroscope 200 adapted to detect the amount of spin or rotation about, e.g., the z-axis (perpendicular to the plane of the page), in accordance with one embodiment of the present invention. Although not shown, it is understood that optical gyroscope 200 also includes similar components adapted to detect the amount of rotations about both x and y axes.

Optical gyroscope 200 is similar to optical gyroscope 100 except that optical gyroscope 200 includes a phase modulator 170, and first and second beam splitters/combiners (Y-junction) 160,170. Phase modulator 170 is adapted to introduce, for example, 90° phase shift to the optical signal delivered to or received from optical ring 110.

The laser beam supplied by laser source 105 is delivered to optical switch 125 which has a switching frequency of $f_0$ defined by the period 1/T. During a first half of each such period T, switch 195 of optical switch 125 is placed in position 190 so as to deliver the laser beam to first optical path 102, which is subsequently received and detected by photodetector 140. During a second half of each such period, optical switch 125 is placed in position 192 so as to deliver the laser beam to second optical path 112, which is subsequently received and detected by photodetector 130.

The optical beam supplied to path 142 from path 112 through optical coupler 116 is split at Y-junction 160 into two components. The first component of the beam so split passes through phase modulator 170 before entering optical ring 110 via optical coupler 118. The second component of the beam travelling on path 142 is delivered to optical ring 120 via optical coupler 114. The beam traveling in ring 110 is delivered to path 156 via optical coupler 108. Similarly, the beam traveling in ring 120 is delivered to path 158 via optical coupler 104. The beams in paths 156 and 158 are combined by Y-junction 170 and received by photodiode 130 from path 152 via coupler 106.

Similarly, the optical beam supplied to path 152 from path 102 through optical coupler 106 is split at Y-junction 170 into two components. The first component of the beam so split enters optical ring 110 via optical coupler 108. The second component of the beam travelling in path 152 is delivered to optical ring 120 via optical coupler 104. The beam traveling in ring 110 is delivered to path 180—via coupler 118—and passes through phase modulator 170 before reaching Y-junction 160. The beam traveling in ring 120 is delivered to path 148—via coupler 114—before reaching Y-junction 160. The beams in paths 146 and 148 are combined by Y-junction 160 and received by photodiode 140 from path 142 via coupler 116.

Referring to FIG. 3, assume that optical rings 110 and 120 are tuned ring resonators. During the first half of each period $$0 < t < \frac{T}{2},$$

when switch 195 of optical switch 125 is placed in position 190 to deliver the beam to optical path 102, the power $P_{out2}$ detected by photodetector 140 may be defined as:

$$P_{out2}=P_{in}K_1\alpha_1(1-\alpha_2)((X_1E_i')^2+(X_{11}E_{ii}')^2-2X_1E_i'X_{11}E_{ii}' \sin(\varphi_1-\varphi_{11}+\Delta\varphi_{ther}+(S_1-S_{11})\delta f-2Q\Delta\varphi_{sag})) \quad (2)$$

In equation (2), $P_{out2}$ represents the amount of optical power detected by photo detector 140, $P_{in}$ is the power supplied by laser source 105, $K_1$ represents the fraction of the laser power delivered to path 102 by switch 125 (which ideally is equal to 1), $\alpha_1$ represents the coupling coefficient of optical coupler 106 (which ideally is equal to 0.5), $\alpha_2$ represents the coupling coefficient of optical coupler 116, $X_1$ and $X_{11}$ represent the attenuation coefficients of ring resonators 110 and 120 respectively, $E_i'$ represents the electric field in ring 110 as the beam travels in a clockwise direction in ring 110 during this half period, $E_i$ represents the electric field in ring 110 associated with a portion of the beam that travels in a counter clockwise direction in ring 110 due to non-ideal characteristics, $E_{ii}'$ represent the electric field in ring 120 as the beam travels in a counter clockwise direction in ring 120 during this half period, $E_{ii}$ represents the electric field in ring 120 associated with a portion of the beam that travels in a clockwise direction in ring 120 due to non-ideal characteristics, $\varphi_1$ represents the phase of the beam as it exits ring 110 during this half period, $\varphi_2$ represents the phase of the beam as it exists ring 120 during this half period, $\Delta\varphi_{ther}$ represents the phase shift caused by thermal fluctuations in the rings, $S_1$ and $S_2$ represents the amplifications factors of rings 110 and 120 respectively due to resonance, $\delta f$ represents the phase noise of laser beam, $Q$ represents the combined amplification factors of rings 110, 120, and $\Delta\varphi_{sag}$ represents the phase shift due to Sagnac effect, that gyroscope 200 is adapted to detect.

Given the above definitions, it is seen that:

$$E_i^2+E_{ii}^2=1$$

$$E_i'^2+E_{ii}'^2=1$$

During the first half of each period $$0 < t < \frac{T}{2},$$

power $P_{out1}$ detected by photodetector 130 (due to non-ideal characteristics) may be defined as:

$$P_{out1}=P_{in}(1-K_1)\alpha_2(1-\alpha_1)((X_1E_i)^2+(X_{11}E_{ii})^2- 2X_1E_rX_{11}E_{ii} \sin(\varphi_1-\varphi_{11}+\Delta\varphi_{ther}+(S_1-S_{11})\delta f+ 2Q\Delta\varphi_{sag})) \quad (3)$$

During the second half of each period $$\frac{T}{2} < t < T,$$

when switch 195 of optical switch 125 is in position 192 to deliver the beam to optical path 112, power $P_{out2}$ detected by photodetector 140 may be defined as:

$$P_{out2}=P_{in}(1-K_2)\alpha_1(1-\alpha_2)((X_1E_i')^2-2X_1E_i'X_{11}E_{ii}' \sin(\varphi_1-\varphi_{11}+\Delta\varphi_{ther}+(S_1-S_{11})\delta f-2Q\Delta\varphi_{sag})) \quad (4)$$

In equation (4), $K_2$ represents the fraction of the laser power delivered to path 102 by switch 125 (which ideally is equal to 1). During the second half of each period, power $P_{out1}$ detected by photodetector 130 may be defined as:

$$P_{out1}=P_{in}K_2\alpha_2(1-\alpha_1)((X_1E_i)^2+(X_{11}E_{ii})^2-2X_1E_rX_{11}E_{ii} \sin(\varphi_1-\varphi_{11}+\Delta\varphi_{ther}+(S_1-S_{11})\delta f+2Q\Delta\varphi_{sag})) \quad (5)$$

Assuming ideal conditions in which case both $K_1$ and $K_2$ would be equal to 1, during the first period $P_{out1}$ would be zero and during the second period $P_{out2}$ would be zero. Therefore, under such conditions, signal $P_{out1}$ of the first period and signal $P_{out2}$ of the second period would not contribute to the combined signals received by photo detectors 130 and 140 during the sum of the first and second periods. Assuming ideal conditions, such as when $\alpha_1=\alpha_2$, $K_1=K_2$, $X_1=X_{11}$, and the like, the only difference between signal $P_{out2}$ during the first period and signal $P_{out1}$ during the second period is the sign of the term $\Delta\varphi_{sag}$. Accordingly, under such ideal conditions, the sum of signal $P_{out2}$ of the first period and signal $P_{out1}$ of the second is proportional to the term $\Delta\varphi_{sag}$ which is the signal of interest to be detected.

Figure 4:
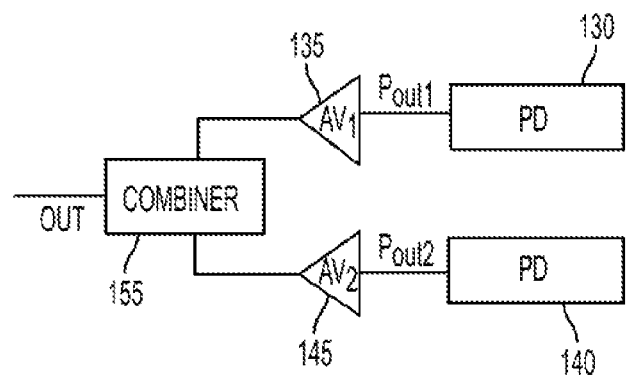
FIG. 4 is a simplified schematic block diagram of circuitry adapted to combine the outputs of the photo detectors of the optical gyroscopes shown in FIG. 2 or 3, in accordance with one embodiment of the present invention.

To account for non-ideal characteristics when detecting signal $\Delta\varphi_{sag}$, in accordance with one aspect of the present invention, the output signal of each of photodetectors 130 and 140 is amplified by the gain of a trans-impedance amplifier before the two output signals are combined. FIG. 4 shows a simplified schematic block diagram of photodiodes 130 and 140 (see FIG. 3) whose outputs are amplified by trans-impedance amplifiers 135 and 145 respectively assumed to have gains of $A_{v1}$ and $A_{v2}$ respectively. The outputs of trans-impedance amplifiers 135 and 145 are received by and combined by combiner 155 to generate signal Out representative of the degree of rotation along, e.g., the z-axis, as described above. In one embodiment, combiner 155 adds the signal $\Delta\varphi_{sag}$ representative of the degree of rotation to a base signal during a first half period of each cycle, and subtracts signal $\Delta\varphi_{sag}$ from the base signal during a second half period of each cycle.

Accordingly, during the first half of each period $$0 < t < \frac{T}{2}$$

signal Out may be defined as:

$$Out=A_{v1}P_{out1}+A_{v2}P_{out2}=A_{v1}(\gamma_1+k_1\Delta\varphi_{sag})+A_{v2}(\gamma_2-k_2\Delta\varphi_{sag}) \quad (6)$$

Likewise, during the second half of each period $$\frac{T}{2} < t < T$$

signal Out may be defined as:

$$Out=A_{v1}P_{out1}+A_{v2}P_{out2}=A_{v1}(\gamma_1'+k_1'\Delta\varphi_{sag})+A_{v2}(\gamma_2'-k_2'\Delta\varphi_{sag}) \quad (7)$$

In simplified equations (6) and (7), parameters $\gamma_1$, $k_1$, $\gamma_2$, $k_2$, $\gamma_1'$, $k_1'$, $\gamma_2'$, $k_2'$ are understood to represent the combined effects of the corresponding parameters shown in equations (2), (3), (4) and (5). During each half period, signal Out may be made to depend directly on parameter $\Delta\varphi_{sag}$ if the following expression holds:

$$\frac{A_{v1}}{A_{v2}} = \frac{\gamma_2' - \gamma_2}{\gamma_1 - \gamma_1'} \quad (8)$$

In deriving equation (8) it is assumed that $\gamma_2' > \gamma_2$ and $\gamma_1 > \gamma_1'$ indicating that when switch 195 is placed in position 190, more than 50% of the laser beam power is delivered to path 102, and when switch 195 is placed in position 192, more than 50% of the laser beam power is delivered to path 112.

Figure 5:
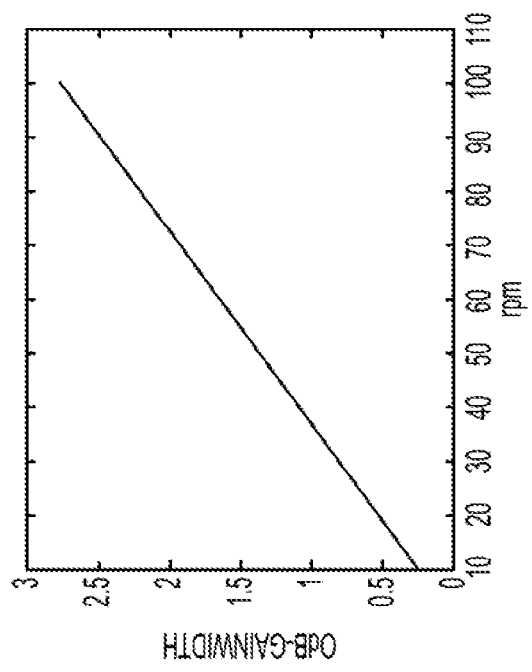
FIG. 5 is a computer simulation showing the gain ratio in dB as a function of the number of rotations per minute.

FIG. 5 is a computer simulation showing the gain in dB of $$\frac{A_{v1}}{A_{v2}}$$

along the Y-axis as a function of the number of rotations per minute (RPM) along the X-axis. As is seen from FIG. 6, to more accurately determine $\Delta\varphi_{sag}$ as the RPM of the gyroscope decreases, the higher should be the accuracy with which $$\frac{A_{v1}}{A_{v2}}$$

is selected.

Figure 6:
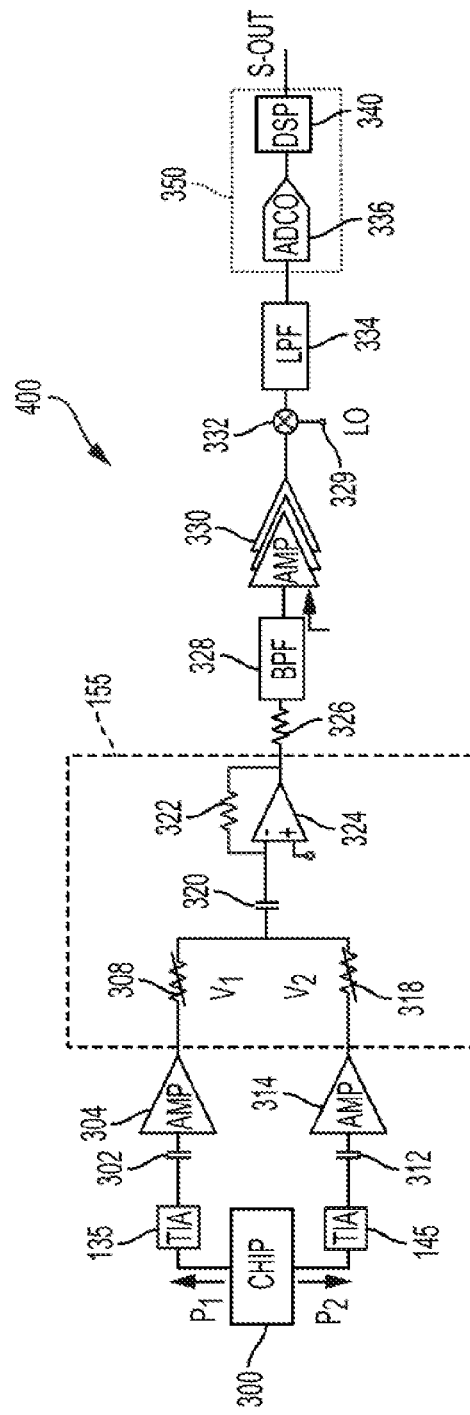
FIG. 6 is a high-level block diagram of an integrated optical gyroscope, in accordance with one embodiment of the present invention.

FIG. 6 is a high-level block diagram of an integrated optical gyroscope system 400 in accordance with another embodiment of the present invention. Gyroscope system 400 is adapted to detect the degree of rotations along x, y and z directions and is shown as including in, part, an integrated photonics chip 300. Integrated photonics chip 300 may include the gyroscopes 200 or 300 shown in FIGS. 2 and 3 respectively. Output current signals $P_1$ and $P_2$ generated by, e.g., photodetectors 130 and 140 shown in FIGS. 2 and 3, are amplified by trans-impedance amplifiers 135 and 145 respectively. The output voltage of trans-impedance amplifiers 135 is further amplified by voltage amplifier 304 after passing through bypass capacitor 302 which is adapted to block DC components of the signal. Similarly, the output voltage of trans-impedance amplifiers 145 is further amplified by voltage amplifier 314 after passing through bypass capacitor 312.

Variable resistors 308, 318 together with amplifier 324 and feedback resistor 322 are adapted to set the relative gain of the voltages $V_1$ (received from resistor 308) and $V_2$ (received from resistor 318) and add the voltages together. For example, if feedback resistor 322 is selected to have a resistance of 20 KΩ and resistors 308 and 318 are selected to have resistances of 1 KΩ and 2 KΩ respectively, amplifier 324 will generate an output voltage defined by $20V_1+10V_2$. Resistors 308, 318, by-pass capacitor 320, amplifier 324 and resistor 322 collectively show one exemplary embodiment of combiner 155 shown in FIG. 4. Bandpass filter 328 is adapted to filter out signal components whose frequencies fall within a selected range. Resistor 326 is adapted to match the output impedance of amplifier 324 to the input impedance of bandpass filter 328.

The output signal of the bandpass filter 328 is further amplified by amplifier 330 and its frequency is downconverted to a baseband signal by mixer 332 in response to local oscillator (LO) signal 329. The output of mixer 322 is filtered by low-pass filter 334. Micro-controller 350, shown as including an analog-to-digital converter 336 and a digital signal processor 340, converts the output of low-pass filter 334 to a read-out value $S_{out}$ representative of the degree of rotation of the gyroscope about any of the three axes.

Figure 7:
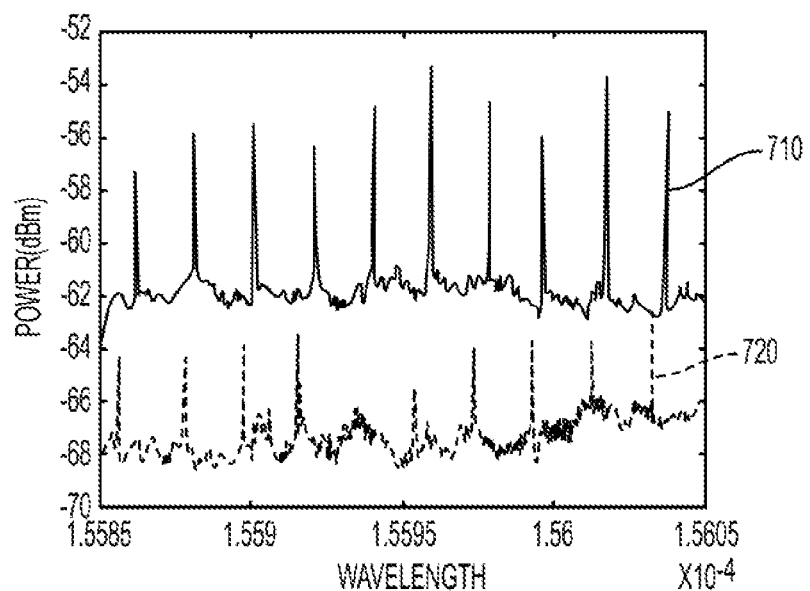
FIG. 7 shows plots of measured output powers in dB as a function of wavelength of the laser beam for two different optical rings fabricated in vicinity of one another.

FIG. 7 shows plots 710 and 720 of measured output powers in dB as a function of wavelength of the laser beam for two different optical rings that are fabricated close to one another. As is seen from FIG. 7, the peaks of the output powers occur at different wavelengths or frequencies for the two optical rings indicating a mismatch between the characteristics of two optical rings even when they are formed near one another.

Figure 8:
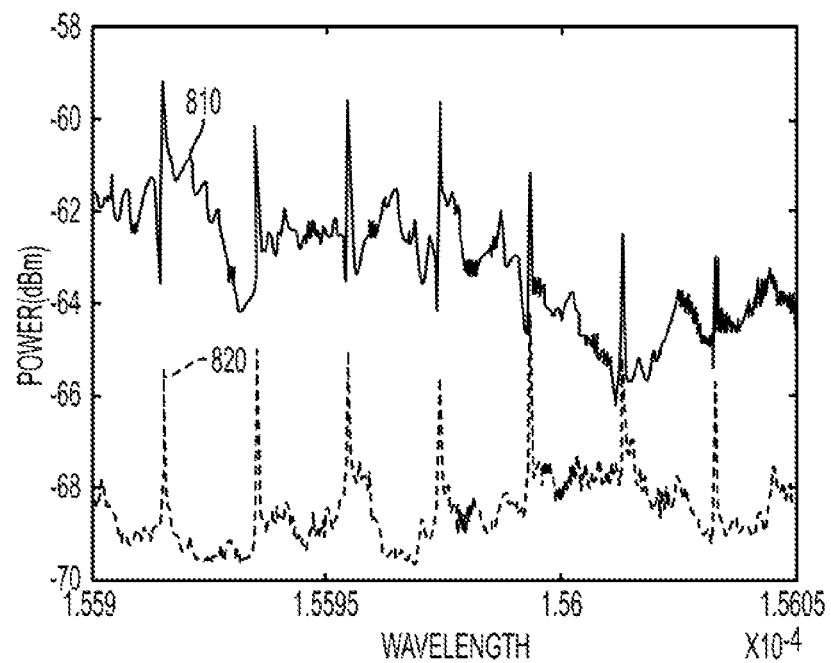
FIG. 8 shows plots of measured output powers in dB as a function of wavelength for the same optical ring.

FIG. 8 shows plots 810 and 820 of measured output powers in dB as a function of wavelength for the same optical ring. Plot 810 shows the measurement at a first port (e.g., output port) of the ring when the beam is enable to enter the ring from its second port (e.g., input port). Plot 820 shows the measurement at the second first port (e.g., input port) of the ring when the beam is enable to enter the ring from its first port (e.g., output port). As is seen from FIG. 8, the peaks of plots 810 and 820 occur at substantially the same frequencies thus indicating that for the same ring the scattering parameters $S_{12}$ and $S_{21}$ are substantially equal and thus validating many of the assumptions made above. In other words, an integrated optical gyroscope, in accordance with embodiments of the present invention, benefits from the reciprocity of the structures shown above to overcome mode conversion. An integrated optical gyroscope, in accordance with embodiments of the present invention, further benefits from the fact that thermal phase noise (phase shift), ring mismatches and laser phase noise are independent of direction, and cancels out such effect.

In some embodiment, optical rings 110 and 120 may be ring resonators that are tuned, as described above. To tune the ring resonators, some embodiment of the present invention include heaters adapted to heat the rings. In some embodiment, the heaters are resistive heaters that may be arranged along portions of the inner areas and/or outer areas of the rings.

Figure 9A:
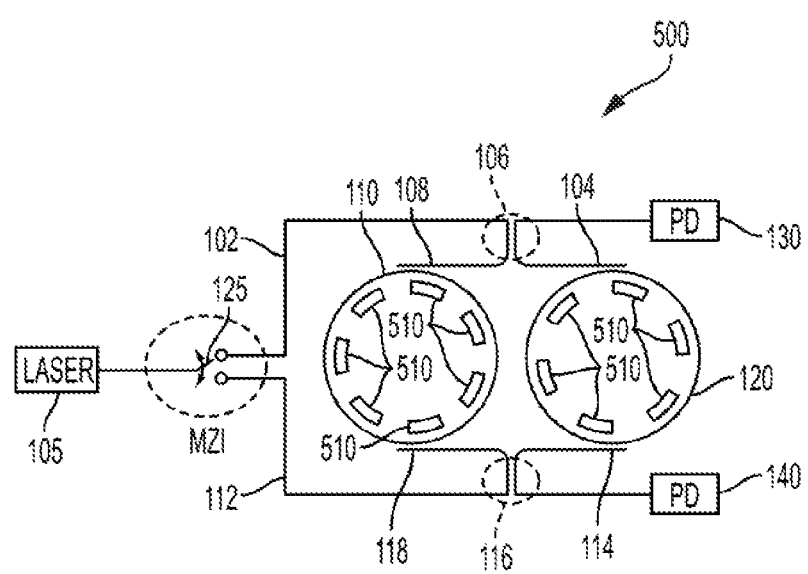
FIG. 9A is a simplified high-level block diagram of components of an optical gyroscope adapted to detect the amount of spin or rotation along an axis, in accordance with one embodiment of the present invention.

FIG. 9A is a simplified high-level block diagram of components of an optical gyroscope 500 adapted to detect the degree of spin along, e.g., the z-axis, in accordance with one embodiment of the present invention. Optical gyroscope 500 is similar to optical gyroscope 100 of FIG. 2 except that optical gyroscope 500 includes resistive heating elements 510 positioned adjacent portions of the periphery and within inner areas of rings 110 and 120.

Figure 9B:
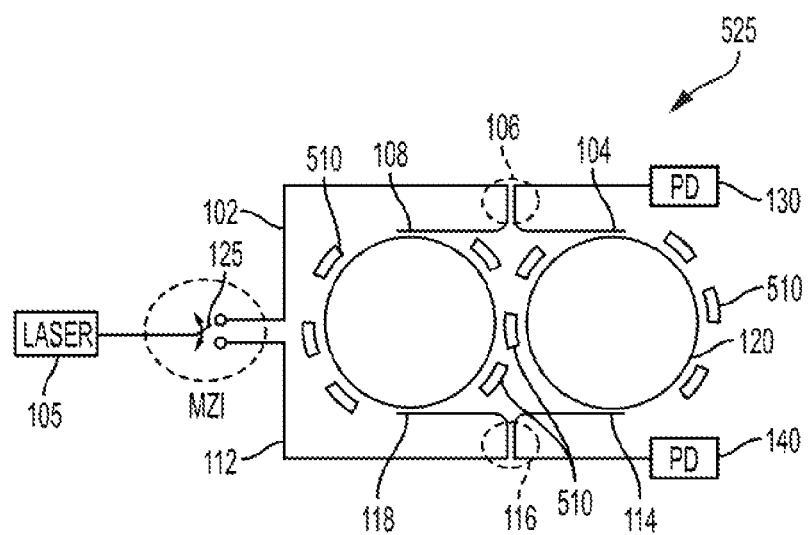
FIG. 9B is a simplified high-level block diagram of components of an optical gyroscope adapted to detect the amount of spin or rotation along an axis, in accordance with one embodiment of the present invention.

FIG. 9B is a simplified high-level block diagram of components of an optical gyroscope 525 adapted to detect the degree of spin along, e.g., the z-axis, in accordance with one embodiment of the present invention. Optical gyroscope 500 is similar to optical gyroscope 100 of FIG. 2 except that optical gyroscope 500 includes resistive heating elements 510 positioned adjacent portions of the periphery and within outer areas of rings 110 and 120.

Figure 9C:
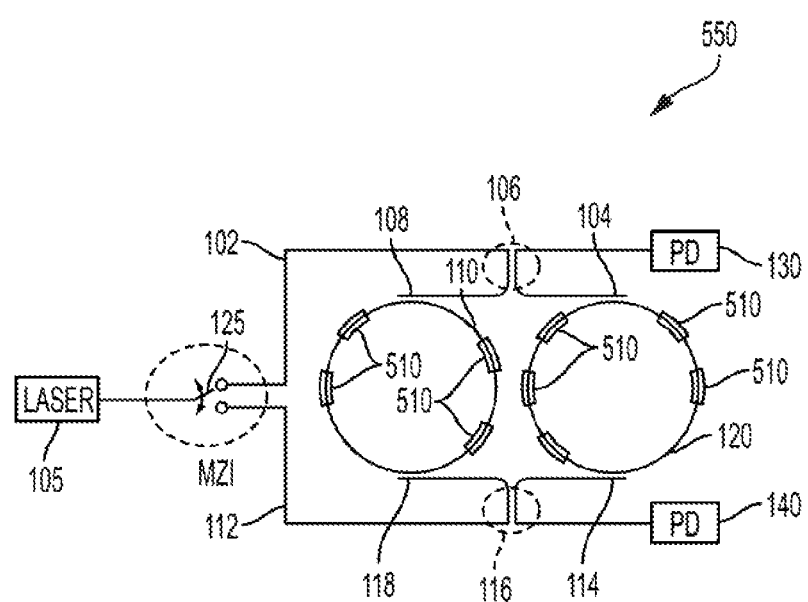
FIG. 9C is a simplified high-level block diagram of components of an optical gyroscope adapted to detect the amount of spin or rotation along an axis, in accordance with one embodiment of the present invention.

FIG. 9C is a simplified high-level block diagram of components of an optical gyroscope 550 adapted to detect the degree of spin along, e.g., the z-axis, in accordance with one embodiment of the present invention. Optical gyroscope 550 is similar to optical gyroscope 100 of FIG. 2 except that optical gyroscope 550 includes resistive heaters 510 that partly overlap portions of the rings 110 and 120 either above or below the rings. In yet other embodiments, not shown, the resistive elements may be positioned within inner areas and outer areas of the rings and furthermore, may overlap the rings.

Figure 10:
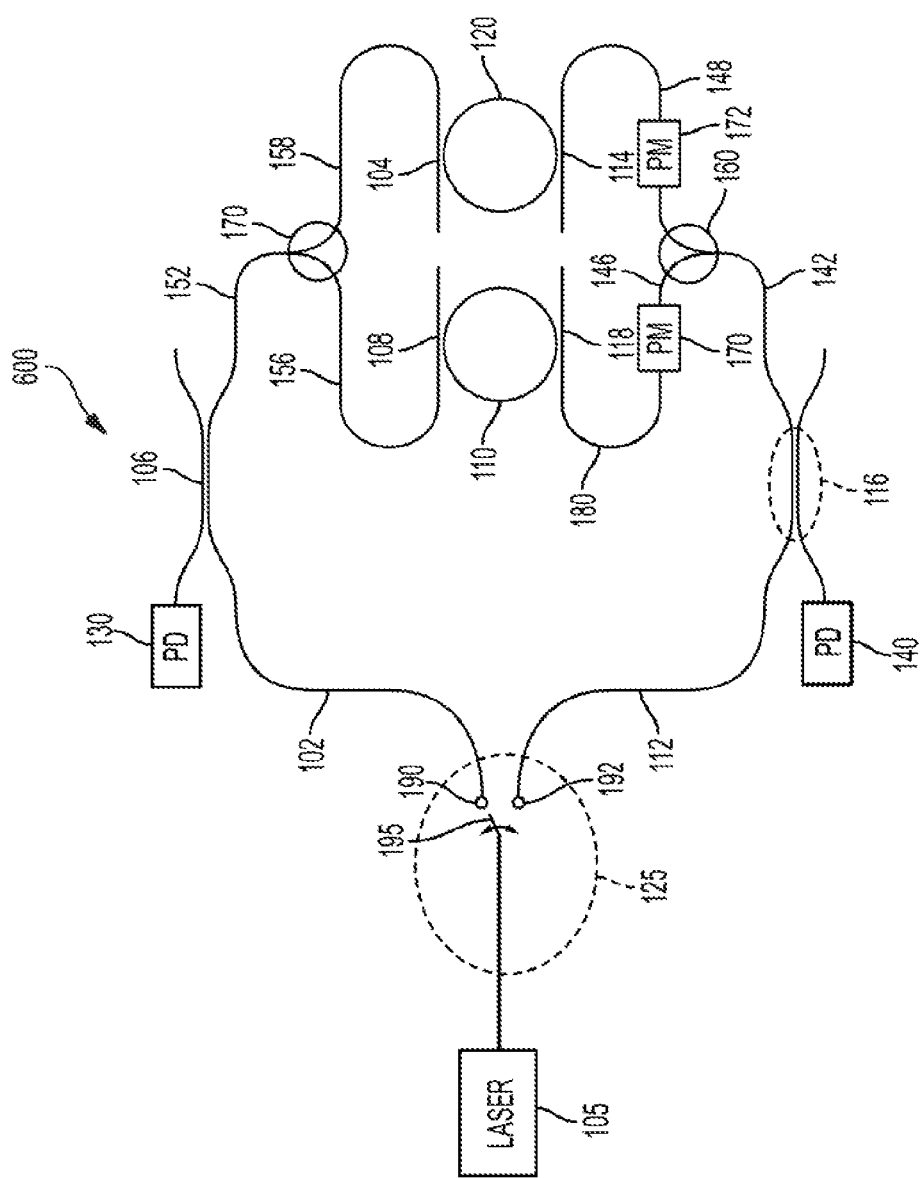
FIG. 10 is a simplified high-level block diagram of components of an optical gyroscope adapted to detect the amount of spin or rotation along an axis, in accordance with one embodiment of the present invention.

FIG. 10 is a simplified high-level block diagram of components of an optical gyroscope 600 adapted to detect the degree of spin along, e.g., the z-axis, in accordance with one embodiment of the present invention. Optical gyroscope 600 is similar to optical gyroscope 300 shown in FIG. 3 except that optical gyroscope 600 includes a second phase modulator 172 adapted to introduce, for example, a 90° phase shift to the optical signal delivered to or received from optical ring 120.

Figure 11:
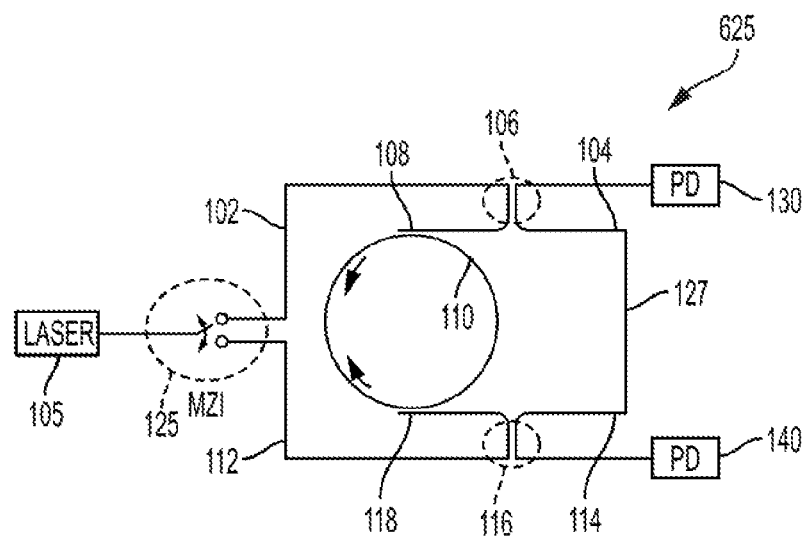
FIG. 11 is a simplified high-level block diagram of components of an optical gyroscope adapted to detect the amount of spin or rotation along an axis, in accordance with one embodiment of the present invention.

FIG. 11 shows an optical gyroscope 625, in accordance with another embodiment of the present invention. Optical gyroscope 625 is similar to optical gyroscope 200 except that optical gyroscope 600 includes one optical ring and a waveguide 127 in place of optical ring 120.

Figure 12:
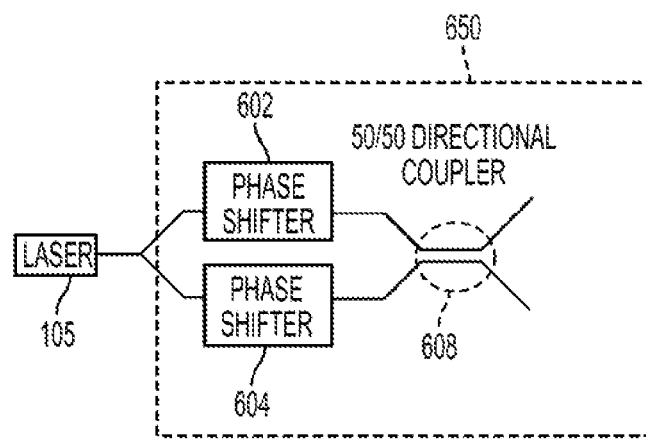
FIG. 12 is a simplified high-level block diagram of the optical switch used in optical gyroscopes of FIGS. 2 and 3, in accordance with one embodiment of the present invention.

FIG. 12 is a simplified high-level block diagram of optical switch 650 corresponding to optical switch 125 shown for example, in FIGS. 2 and 3. Optical switch 600 is a Mach Zehnder interferometer shown as including, in part, first and second phase shifters 602, 604 and a 50/50 directional coupler 608.

Figure 13:
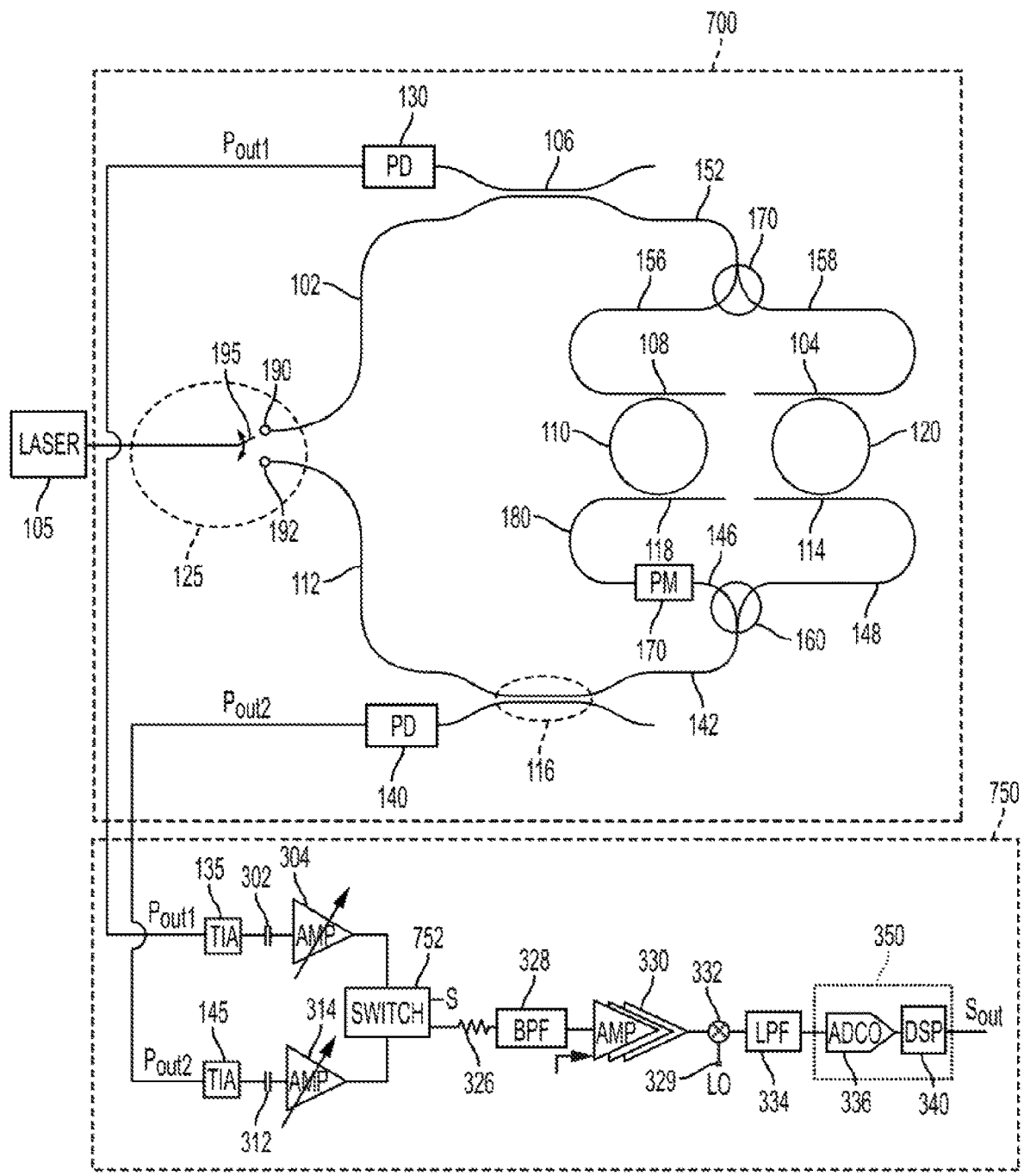
FIG. 13 is a simplified high-level block diagram of components of an optical gyroscope adapted to detect the amount of spin or rotation along an axis, in accordance with one embodiment of the present invention.

FIG. 13 is a simplified high-level block diagram of components of an optical gyroscope 700 together with the control circuitry 750 (in a manner similar to combined FIGS. 3 and 6) adapted to detect the degree of spin about, e.g., the z-axis, in accordance with one embodiment of the present invention. In the embodiment shown in FIG. 13, signal $P_{out1}$ generated by photodetector 130 is delivered to trans-impedance amplifier 135 during the first half of each period $$0 < t < \frac{T}{2}$$

and signal $P_{out2}$ generated by photodetector 140 is delivered to trans-impedance amplifier 145 during the second half of each period $$\frac{T}{2} < t < T.$$

Bypass capacitor 302 delivers the output of trans-impedance amplifier 135 to variable gain amplifier 304 and bypass capacitor 312 delivers the output of trans-impedance amplifier 145 to variable gain amplifier 314. Electronic switch 752 operates to deliver the output of variable gain amplifier 304 to resistor 326 during the first half of each period $$0 < t < \frac{T}{2}$$

and to deliver the output of variable gain amplifier 314 to resistor 326 during the second half of each period $$\frac{T}{2} < t < T.$$

Bandpass filter 328, amplifier 330, mixer 322, low-pass filter 33 and controller 350 operate in the same manner as described above with respect to FIG. 6. Signal $S_{out}$ is the read-out of controller 350 showing the degree of rotation about any of the axis. electronic switch 752 operates to deliver signal $P_{out1}$ generated by photodetector 130 to trans-impedance amplifier 135 during the first half of each period $$0 < t < \frac{T}{2}$$

and to deliver signal $P_{out2}$ generated by photodetector 140 to trans-impedance amplifier 145 during the second half of each period $$\frac{T}{2} < t < T$$

Figure 14:
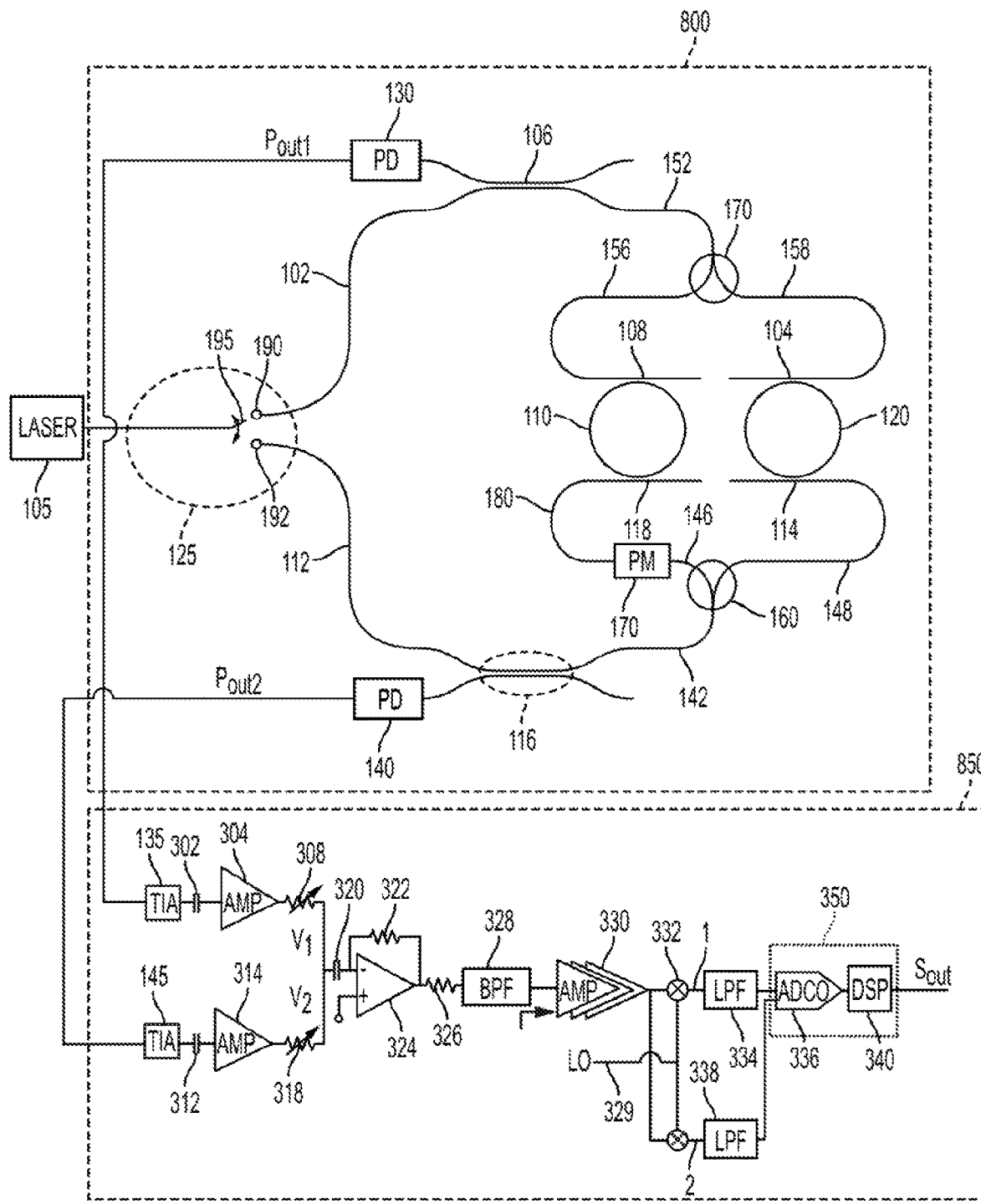
FIG. 14 is a simplified high-level block diagram of components of an optical gyroscope adapted to detect the amount of spin or rotation along an axis, in accordance with one embodiment of the present invention.

FIG. 14 is a simplified high-level block diagram of components of an optical gyroscope 800 together with the control circuitry 850 adapted to detect the degree of spin along, e.g., the z-axis, in accordance with one embodiment of the present invention. In the embodiment shown in FIG. 14, phase modulator 170 is adapted to further modulate, at a modulation frequency $f_1$, the phase of the signal received or delivered by optical ring 110. For example, in addition to a phase shift of, e.g., 90°, phase modulator 170 modulates this, e.g., 90° phase shift by a predefined amount using at a modulation frequency of $f_1$. Signal $P_{out1}$ generated by photodetector 130 is delivered to trans-impedance amplifier 135 during the first half of each period $$0 < t < \frac{T}{2}$$

and signal $P_{out2}$ generated by photodetector 140 is delivered to trans-impedance amplifier 145 during the second half of each period $$\frac{T}{2} < t < T.$$

The remaining elements of control circuitry 850 operate in the same manner as described above with respect to FIG. 6 except that control circuitry 850 generates an in-phase signal I and a quadrature phase signal Q using a local oscillator (LO) signal 329 that operates at frequency $(f_0+2f_1)$, The output signals of low-pass filters 334 and 338 are delivered to controller 350 which generates readout signal $S_{out}$ showing the degree of rotation about any of the axis.

The above embodiments of the present invention are illustrative and not limitative. Other modifications and variations will be apparent to those skilled in the art and are intended to fall within the scope of the appended claims.

What is claimed is:
1. An optical gyroscope comprising:
   first and second optical paths formed using optical waveguides in a semiconductor substrate;
   a coherent laser source generating two optical signals traveling in the first optical path in one direction and in the second optical path in a second direction; and
   a photodetector adapted to receive the beams delivered by the first and second optical paths, wherein at least one of the optical waveguides is an optical ring, wherein said optical ring is a ring resonator, wherein said photodetector is adapted to receive the beams delivered by the first and second optical paths during a first half of each period, the optical gyroscope further comprising a second photodetector adapted to receive the beams delivered by the first and second optical paths during a second half of each period.

2. The optical gyroscope of claim 1 further comprising:
an amplifier adapted to amplify an output of the photodetector.

3. The optical gyroscope of claim 1 further comprising a combiner adapted to combine the output of the first photodetector with a first signal during each first half of each period and to combine the output of the second photodetector with the first signal during each second half of each period.

4. The optical gyroscope of claim 1 further comprising a switch configured to switch between the outputs of the first and second photodetectors.

5. The optical gyroscope of claim 3 further comprises a heater adapted to heat the ring resonator.

6. The optical gyroscope of claim 3 further comprising a phase modulator adapted to modulate a phase of the beam delivered to or received from the ring resonator.

* * * * *